United States Patent [19]

Gearin

[11] Patent Number: 4,957,407
[45] Date of Patent: Sep. 18, 1990

[54] METHOD AND APPARATUS FOR LOADING AND UNLOADING MOTOR VEHICLES FROM LIGHTWEIGHT SLEEVES WHICH ARE CARRIED IN STANDARD CARGO CONTAINERS

[75] Inventor: Peter Gearin, Portland, Oreg.

[73] Assignee: G & G Intellectual Properties, Inc., Portland, Oreg.

[21] Appl. No.: 297,061

[22] Filed: Jan. 13, 1989

[51] Int. Cl.$^5$ .................. B65D 88/12; B65D 88/52
[52] U.S. Cl. ................................ 414/498; 414/345; 414/398
[58] Field of Search ............... 414/498, 395, 345, 400, 414/398, 393, 392, 390, 352, 347, 343, 341

[56] References Cited

U.S. PATENT DOCUMENTS

| | | | |
|---|---|---|---|
| 3,094,226 | 6/1963 | Gutridge et al. | 414/347 |
| 3,337,066 | 8/1967 | Reed et al. | 414/345 |
| 3,438,519 | 4/1969 | Willis | 414/395 |
| 3,498,480 | 3/1970 | Gutridge | 414/398 |
| 3,709,155 | 1/1973 | Pringle | 414/347 |
| 3,938,678 | 2/1976 | Kern | 414/498 |
| 4,768,916 | 9/1988 | Gearin et al. | 414/498 |

*Primary Examiner*—David H. Brown
*Attorney, Agent, or Firm*—Chernoff, Vilhauer, McClung & Stenzel

[57] ABSTRACT

A method and apparatus are provided for loading motor vehicles into an open-centered, light-weight sleeve which carries a plurality of the vehicles and is inserted into a standard cargo-carrying container. A sled, which is arranged to carry at least one vehicle, is movable on tracks which extend from outside of the sleeve across substantially its entire extent. Thus, vehicles can be driven onto the sled outside of the sleeve and then transported into the sleeve on the sled. Once in the sleeve a vehicle is raised by gantries which are located outside of the side walls of the sleeve. The gantries have lifting cylinders which releasably attach to cradle latches which are slidable on and attachable to tension members that are suspended from the sides of the sleeve. The cradle latches engage the ends of the cradles, which are carried in the sled below the tires of the vehicle. Thus, when the cradles are raised by the cradle latches they engage the vehicle's tires and the vehicle is raised with them. The sleds are movable by a motor-driven endless chain having a clip which is releasably attachable to the sled. The sled includes rams which are extendable to positions where they protrude past the side walls of the sleeve. Thus, the sled can be used to pull a sleeve out of and push a sleeve into a container.

11 Claims, 7 Drawing Sheets

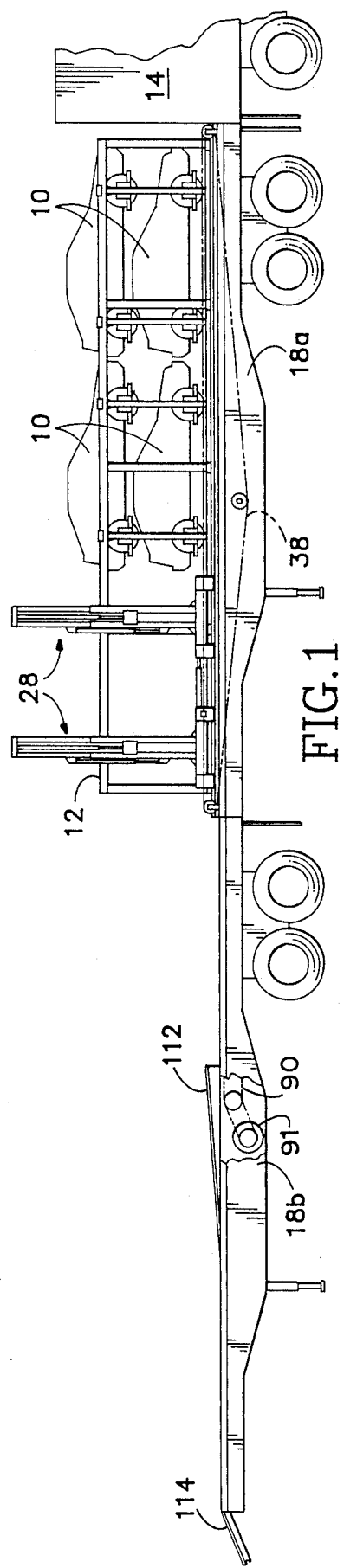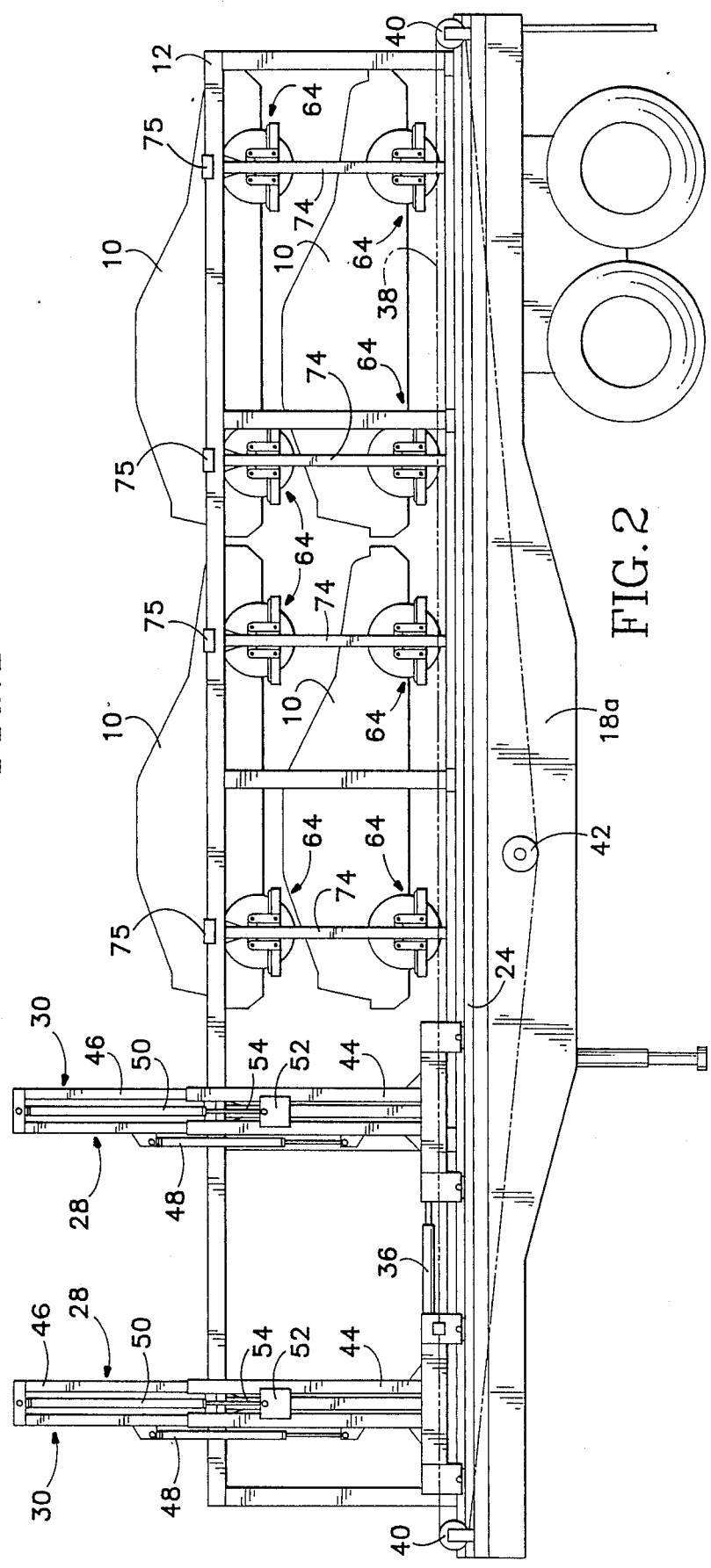

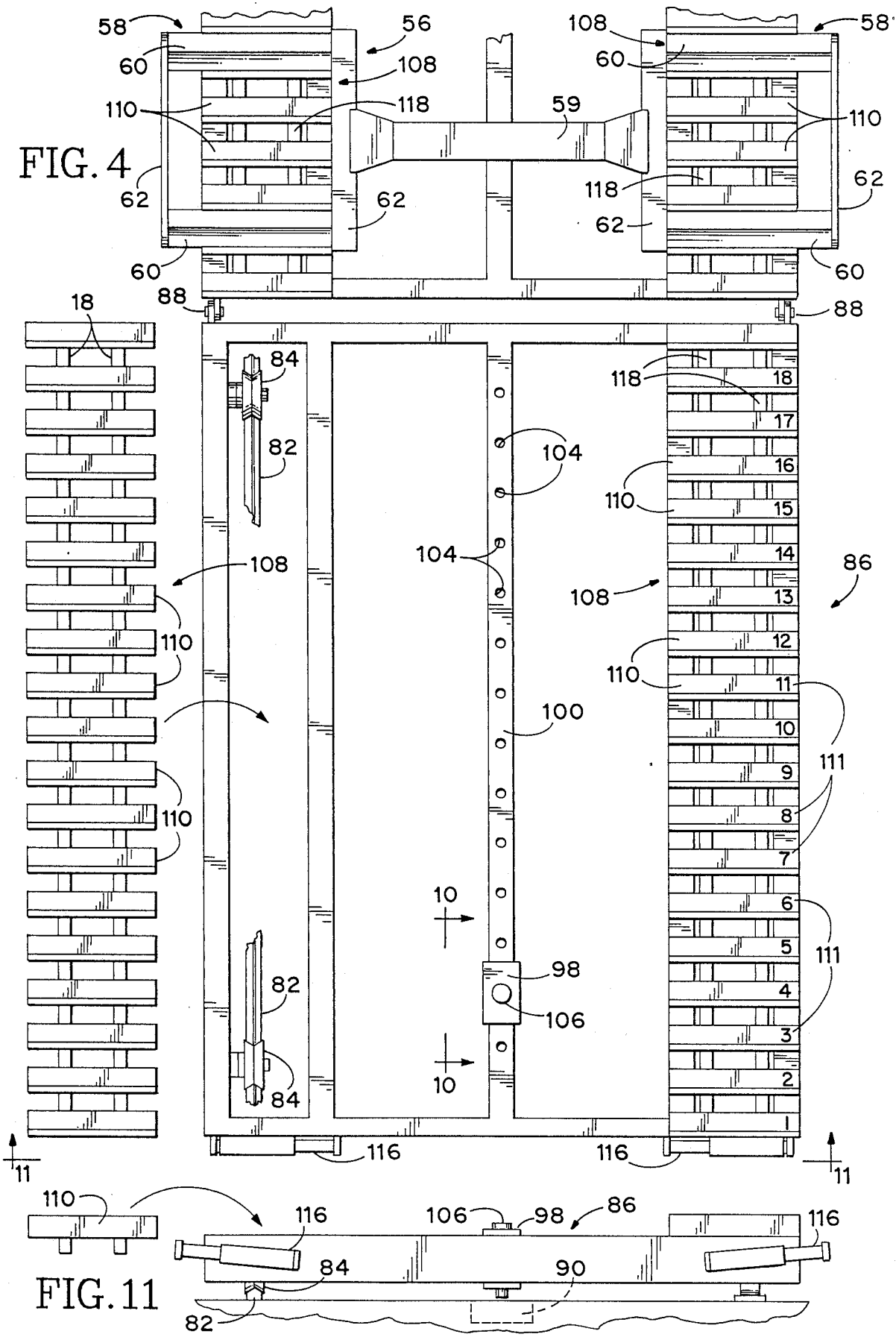

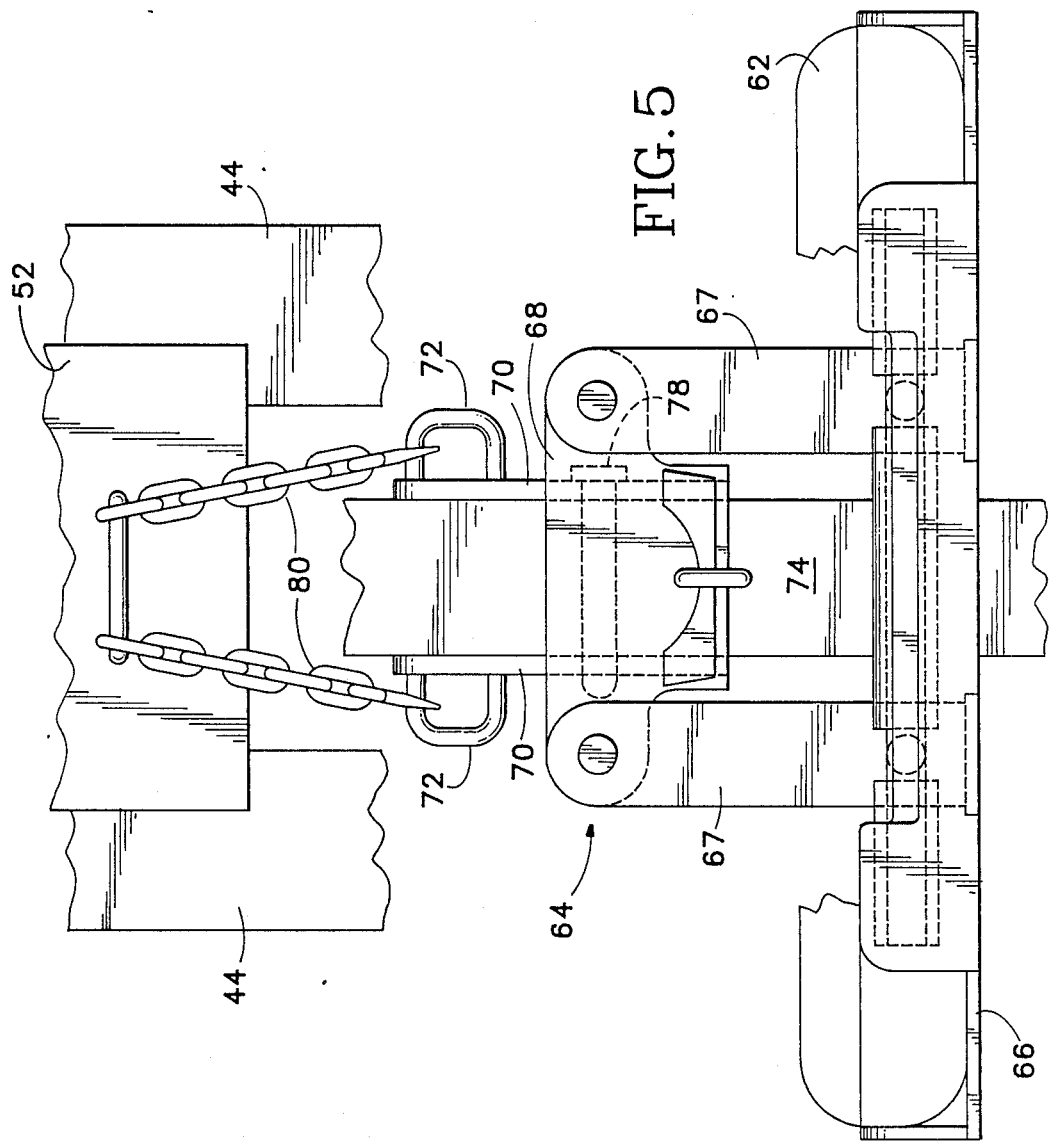
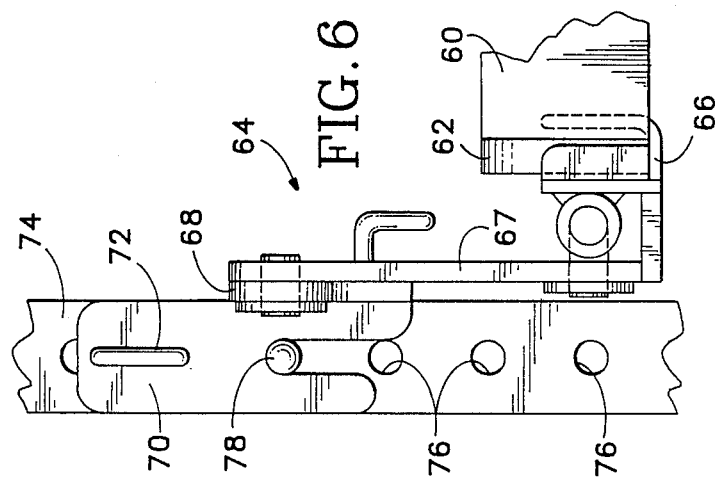

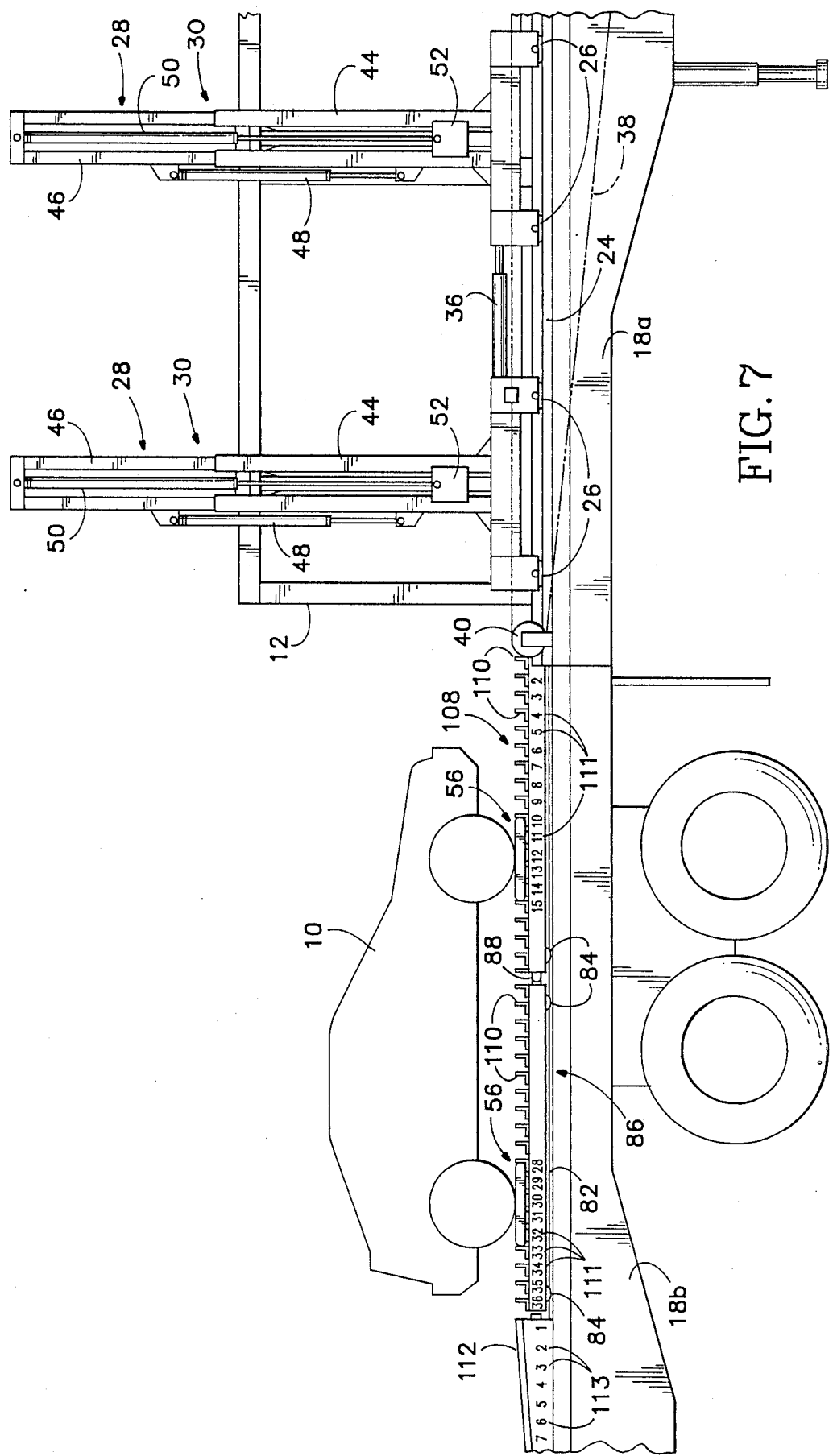

METHOD AND APPARATUS FOR LOADING AND UNLOADING MOTOR VEHICLES FROM LIGHTWEIGHT SLEEVES WHICH ARE CARRIED IN STANDARD CARGO CONTAINERS

BACKGROUND AND SUMMARY OF THE INVENTION

This invention relates to the loading and unloading of motor vehicles, one at a time, into and out of lightweight movable sleeves without having to actually drive the vehicles into and out of the sleeves.

In application Ser. No. 040,469, now U.S. Pat. No. 4,768,916 a lightweight sleeve is disclosed which carries a plurality of motor vehicles in vertically separated rows. Once loaded with vehicles this sleeve is inserted into a standard cargo container which may be transported in a conventional fashion. When the container reaches its destination the sleeve is removed from the container and the vehicles are unloaded from the sleeve. This system has two advantages over loading the vehicles directly into the container. First, it is much easier to attach motor vehicles at multiple levels in an open-sided sleeve than in a narrow enclosed container. In addition, all of the attachment mechanism is in the sleeve, thereby leaving the container clean so that it can be used to carry other types of cargo without any modification.

In these devices the vehicles are attached to the sleeve by means of a pair of cradles, one of which supports the front tires of the vehicle and one of which supports the rear tires of the vehicle. For each vehicle which is loaded into the sleeve a pair of cradles is placed in the sleeve at the proper spacing and the vehicle is driven into the sleeve and over the cradles. Gantries having lifting devices in them are used to raise the cradles to the proper height in the sleeve. Finally, the cradles are attached to tension members which are suspended from the sides of the sleeve.

This system is quite slow since the vehicles must be driven into the sleeve onto the cradles positioned and attached to the sleeve one at a time. In addition, driving the vehicle into or out of a sleeve which is only slightly wider than the vehicle is likely to cause damage to the vehicle, particularly when its door is open to enable the driver to get in or out.

In application Serial No. 181,684 an apparatus was disclosed which speeds up the process of loading motor vehicles into sleeves and eliminates the necessity of driving the vehicles into and out of the sleeves. This apparatus supports a sleeve in a raised position which allows a motor vehicle to be driven onto a lifting device which is positioned below the sleeve. The lifting device then raises the vehicle into the sleeve through its bottom. The cradles, which support the front and rear tires of the vehicle, are positioned between upstanding plates which form the vehicle support surfaces of the lifting device. Thus, the cradles are positioned under the tires of the vehicle when it is driven onto the lifting device and are lifted with the vehicle. Cradle latches, which are attached to the tension members, can be moved to loading positions which permit the cradles to pass by them when the lifting device is raised and to latching positions where they engage the ends of the cradles when the lifting device is lowered. Accordingly, an entire level of vehicles can be lifted into the sleeve at one time and attached nearly automatically when the lifting device is lowered again. Since an entire level of cars is loaded at one time, loading occurs much faster than in the previously disclosed system. In addition, since the vehicles are not driven into the sleeve damage is almost nonexistent. However, devices of this type are extremely expensive and can only be justified where a large volume of cars is being loaded and unloaded on a continual basis.

The subject invention overcomes the foregoing shortcomings and limitations of the prior art by providing a sled which will support at least one motor vehicle and is dimensioned to fit within the lightweight sleeve it will be used to load. The sled is movable on tracks which extend through substantially the entire extent of the sleeve, and at least one sled length in front of it. Thus, the sled can be used to move motor vehicles into and out of a sleeve, which eliminates the necessity of the motor vehicles having to be driven into the sleeve where there is a likelihood that the vehicle will sustain damage. The sled is movable into and out of the sleeve by means of an endless chain which can be driven in either direction by means of a motor.

The sled has a pair of spaced-apart wheel ramps which are formed from rows of side-by-side angle beams. Thus, the cradles which are used to support the front and rear tires can be placed between adjacent pairs of the angle beams so that the tires of the vehicle will pass over them when the vehicle is driven onto the sled. The ends of the cradles are engaged by cradle latches which are slidably raised up a tension member by means of a lifting device located in a gantry which can be moved to any desired position along the sleeve. Pins, which fit through holes in the tension members, attach the cradle latches to the tension members when they have been raised to the proper level.

In a preferred embodiment of the invention, the apparatus is mounted on a pair of flatbed trailers so that it will be aligned with cargo containers which are carried on similar trailers. A first trailer has frame guides extending across its bed which receive the wheels of the sleeve. Located beside the frame guides are gantry guides which receive the wheels on the gantries. Thus, the sleeve and gantries can be moved across the trailer along parallel paths. The tracks which carry the sled run across the entire extent of the first trailer, between the frame guides and the gantry guides, and extend onto the second trailer far enough that the sled can be positioned completely on the second trailer. A ramp is located on the second trailer at the ends of the sled tracks which allows vehicles to be driven up onto the sled.

Identifying indicia marked on the ramp enable the operator to determine the wheel base of the vehicle which is ready to be loaded, and similar indicia marked on the sled allow the operator to place the cradles on the sled at a separation which corresponds to this wheel base. Thus the sled can be prepared for the vehicle before the vehicle is driven onto the sled.

Rams located on the sled move between extended positions where they engage the sides of the sleeve and retracted positions where they do not. Thus the sled can be used to move the sleeve along the sleeve guides into and out of a container.

Accordingly, it is a principal object of the present invention to provide an apparatus which moves motor vehicles one at a time into and out of a lightweight open-centered sleeve without requiring that they be driven.

It is a further object of the subject invention to provide such an apparatus which permits the vehicles to be raised easily and quickly when they are in the sleeve and attached to the sleeve when they are in the raised position.

It is a still further object of the present invention to provide such an apparatus which can also be used to push a sleeve into and pull a sleeve from a cargo container.

It is a still further object of the present invention to provide such an apparatus which uses a sled to move the vehicles into and out of the sleeve.

It is a further object of the present invention to provide such an apparatus which uses cradles that engage the vehicles' tires to lift the vehicles.

It is a yet further object of the subject invention to provide such an apparatus in which the cradles are recessed in the sled when the vehicles are driven onto the sled.

It is a further object of the present invention to provide an apparatus which quickly and easily raises motor vehicles which have been positioned within an open centered sleeve and attaches the vehicles to the sleeve in their raised position.

It is a further object of the present invention to provide a method for loading motor vehicles into a lightweight open centered sleeve without having to drive the vehicles into the sleeve.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view of a vehicle-loading apparatus embodying the features of the present invention.

FIG. 2 is a side elevation view, at an enlarged scale, of a portion of the apparatus of FIG. 1.

FIG. 4 is a fragmentary plan view, with parts removed to show hidden detail, of a sled which is an FIG. 5 is a side elevation view of a cradle latch which is an element of the present invention.

FIG. 6 is an end elevation view of the cradle latch of FIG. 5.

FIG. 7 is a side elevation view of the apparatus of the present invention with a first vehicle positioned on the sled and ready to be loaded into the sleeve.

FIG. 11 is an enlarged partial end elevation view taken along the line 11—11 of FIG. 4 with a portion of the device being removed to show hidden detail.

DETAILED DESCRIPTION OF THE INVENTION

Referring to FIG. 1 of the drawings, the apparatus of the present invention is used to load motor vehicles 10 into and out of a lightweight open-centered sleeve 12 which is dimensioned to fit into a standard cargo-carrying container 14. The sleeve is bottomless which permits the vehicles to be moved into it at ground level and then raised and attached to the side walls of the sleeve.

Since the container typically is raised above the ground, the apparatus of the present invention preferably is raised also. In the embodiment illustrated, the apparatus includes, two flatbed trailers 18a, 18b which are positioned end to end. In addition to elevating the apparatus to a height where it will be aligned with containers which are carried on similar trailers, placing the apparatus on trailers makes the apparatus portable. Thus, it can be transported to remote sites for use.

Figure 3:
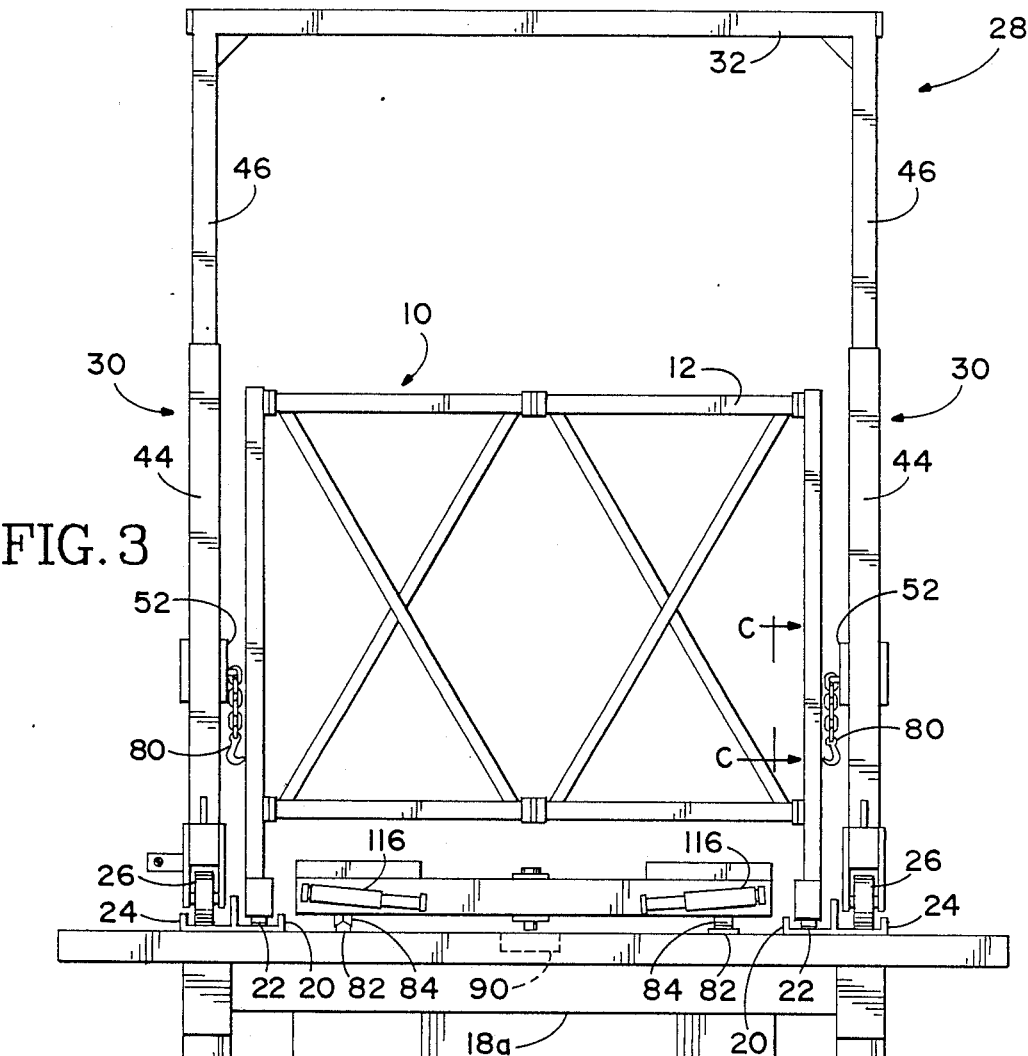
FIG. 3 is an end elevation view, at a more enlarged scale, of the apparatus shown in FIG. 2.

Referring now also to FIGS. 2 and 3, one of the trailers 18a has a pair of U-shaped sleeve guides 20 which extend along its entire length. The sleeve guides are separated from one another by the width of the sleeve so that the wheels 22 which are located along each side of the sleeve fit into the sleeve guides. Located outwardly of the sleeve guides 20 are U-shaped gantry guides 24 which receive the wheels 26 of two gantries 28 which are used to lift the vehicles to the height where they are to be attached to the sleeve 12.

Each gantry is composed of a pair of masts 30 which are joined together at their upper extremity by a transverse cross member 32. In the embodiment illustrated, each mast 30 is of two-stage construction having a lower portion 44 and an upper portion 46 which is vertically slidable relative to the lower portion under the control of a double-acting hydraulic cylinder 48. Another double-acting hydraulic cylinder 50, which depends from the upper portion 46 of each mast, has a frame 52 attached to its piston 54. The two gantries are independent of one another but are tied together through double acting hydraulic cylinders 36 so that the distance between the two gantries can be adjusted by selective activation of the cylinders. Since the gantries lift the vehicles through their tires, as will be more fully explained later, this permits the apparatus to be used with vehicles having different wheel bases.

In addition, both pairs of gantries are movable along the trailer 18a by means of cables 38 which extend over pulleys 40 located at each end of the trailer and are attached to the gantries. The cables wrap around sheaths 42 which are driven by a selectively controllable reversible hydraulic motor, not shown.

When the vehicles are lifted they are supported on elongate cradles 56, one which supports the front tires of a vehicle and one which supports its rear tires. Referring to FIGS. 4 and 5, each cradle 56 has two pads 58 which are connected together by a cross tie 59. Each pad comprises front and rear tire-engaging chocks 60 which are supported on each of their ends by a support plate 62. The pads are separated from one another by a sufficient distance that the tires of the narrowest vehicle that is to be lifted by the cradle will fit into them, and are wide enough to allow the cradle to engage the tires of the widest vehicle.

The cradles are coupled to the gantries by means of cradle latches 64, FIGS. 5 and 6. In the embodiment illustrated, each cradle latch includes a horizontal shelf 66 that is arranged to engage the support plate 62 which is located at the outer extremities of the cradle. The shelf 66 is pivotally connected to a pair of vertical straps 67 which in turn are pivotally connected to a bar 68. Thus, the bar, straps, and shelf form a four-bar parallelogram linkage which allows the shelf to be moved from side to side relative to the bar. The bar 68 is connected to a pair of spaced-apart hooks 70 having eyes 72 projecting from their sides. The spacing between the hooks 70 is such that they fit loosely on each side of an elongate tension member 74, which is releaseably attachable to the sides of the sleeve. A finger 75 located at the top of each tension member slidably fits over the bar which is located at the top of the sleeve and can be affixed to the bar by means of a pin (not shown) which allows a tension member to be attached to the sleeve at any desired position along its longitudinal extent. Each tension member has a series of holes 76 extending through it which releasably receive an elongate pin 78 which is arranged to be engaged by the hooks 70 of the cradle latches. As a result, a cradle latch can be attached to a tension member at different positions along its longitudinal extent. The cradle latches are attached to the frame 52 of the gantries 28 by means of chains 80 which are releasably attachable to the eyes 72. A cradle latch can, therefore, be raised and lowered along a tension member by retraction and extension respectively of the hydraulic cylinders 48 over 50 of the associated gantry.

Extending along the entire linear extent of the first trailer 18a and along a portion of the second trailer 18b is a pair of spaced-apart rails 82 which act as a track for the wheels 84 of a movable sled 86, as can best be seen in FIGS. 4 and 7-9. The rails 82 extend onto the second trailer 18b only far enough so that the sled can be moved completely onto the second trailer. In the embodiment illustrated the sled is divided into two sections which are joined together through a separable pivot joint 88. This allows the sled to be driven partially off of the track into the container 14, as will be more fully explained later, and be separated into two elements for ease of transportation.

Figure 10:
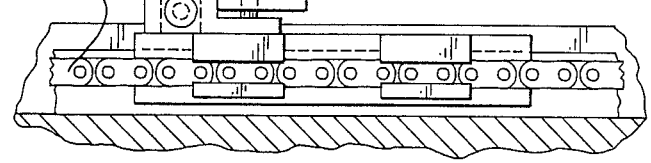
FIG. 10 is a fragmentary side elevation view taken along the line 10—10 in FIG. 4.

The sled is moved along the tracks by means of an endless chain 90, FIG. 10, which runs along the entire length of the first trailer 18a and is selectively movable in either direction by means of a motor 91. The chain has a coupling element 92 attached to one of its lengths which can be removably attached to a tie bar 94 by means of a pin 96. The tie bar is attached to a collar 98 which slidably fits over a center beam 100 of the sled. The collar 98 has aligned openings 102 passing through its upper and lower faces, and like openings 104 are located at spaced-apart intervals along the center beam 100 which permits the collar 98 to be attached to the center beam at any desired point by inserting a pin 106 through the openings 102 and 104.

The sled has a length which will accommodate the longest vehicle that will be placed in the sleeve and yet is narrow enough that it will fit into the sleeve. The sled has a pair of spaced-apart wheel ramps 108 which a vehicle can be driven onto that extend along its side margins. In the embodiment illustrated, each wheel ramp is formed from a series of angle beams 110 which are attached to a pair of bars 118. The vertical legs of the angle beams 110 thus form a row of vertical plates which are spaced apart so that the chocks 60 of a cradle can be placed between them thereby permitting a vehicle which is driven onto the sled to pass over the chocks without contacting them. The wheel ramps are shown in the embodiment illustrated as being removable from the sled which permits the use of other styles of wheel ramps as well as reducing the weight of the sled for transportation.

Located on the second trailer, at the end of the rails 82, is a ramp 112, FIG. 7, which allows a vehicle to be driven onto the sled from the bed of the trailer. Located at the end of the trailer 18b is another ramp 114, FIG. 1, which allows the vehicle to be driven onto the bed of the trailer from the roadway on which the trailer is situated so that a vehicle can be driven from the roadway onto the sled without stopping. However, the ramp 112 is long enough that it will hold one vehicle, which, as will be more fully explained later, allows vehicles to be loaded into the sleeve rapidly.

Since the cradles 56 support a vehicle 70 by its tires, they must be placed on the sled at a separation which is equal to the wheel base of the vehicle being loaded. In order to facilitate the positioning of the cradles on the sled before the vehicle is driven onto it, indicia 111, FIG. 4, which identify each of the angle beams 110, are placed on the sled In the embodiment illustrated the indicia are numbers, but they could take other forms, such as colors. A similar set of indicia 113, FIG. 7, which is spatially congruent with the indicia 111, is placed on the ramp 112. Thus, by looking at the indicia 111 that the tires of a vehicle are located above, the operator of the device can easily determine where the cradle should be placed on the sled.

Referring now to FIGS. 3 and 11, the sled has hydraulically actuated rams 116 located on both sides of the end which faces the sleeve. The rams are positioned such that when they are extended they protrude from the sides of the sled and extend past the sides of the sleeves for engagement therewith, and when they are retracted they do not protrude from the sides of the sled. As a result, the rams can be used to couple the sled to the sleeve so that by moving the sled along the rails 82 the sleeve will be moved along the sleeve guides 20.

Figure 8:
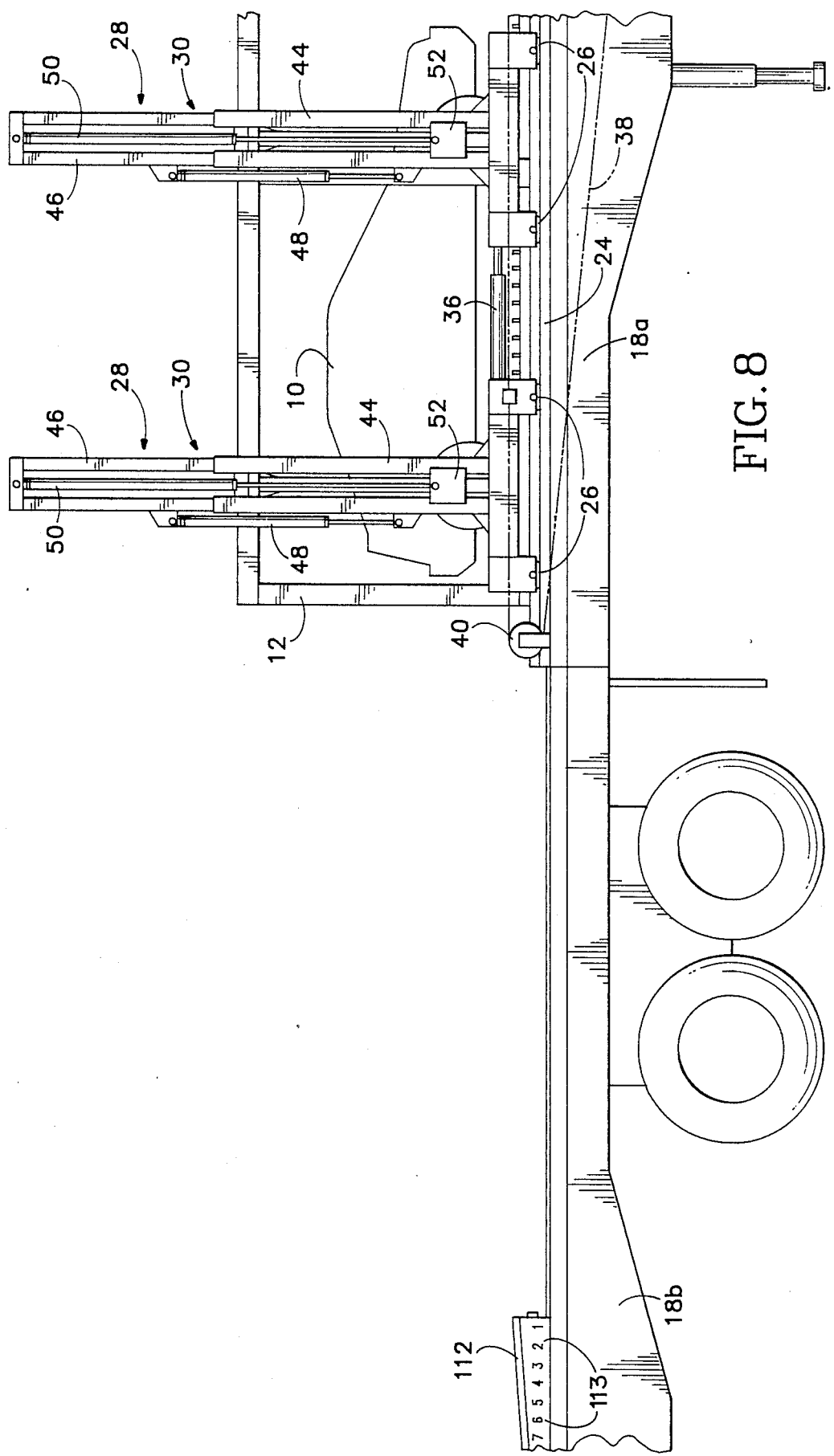
FIG. 8 is a side elevation view, similar to FIG. 7, with the vehicle placed in the sleeve and ready to be raised.
Figure 9:
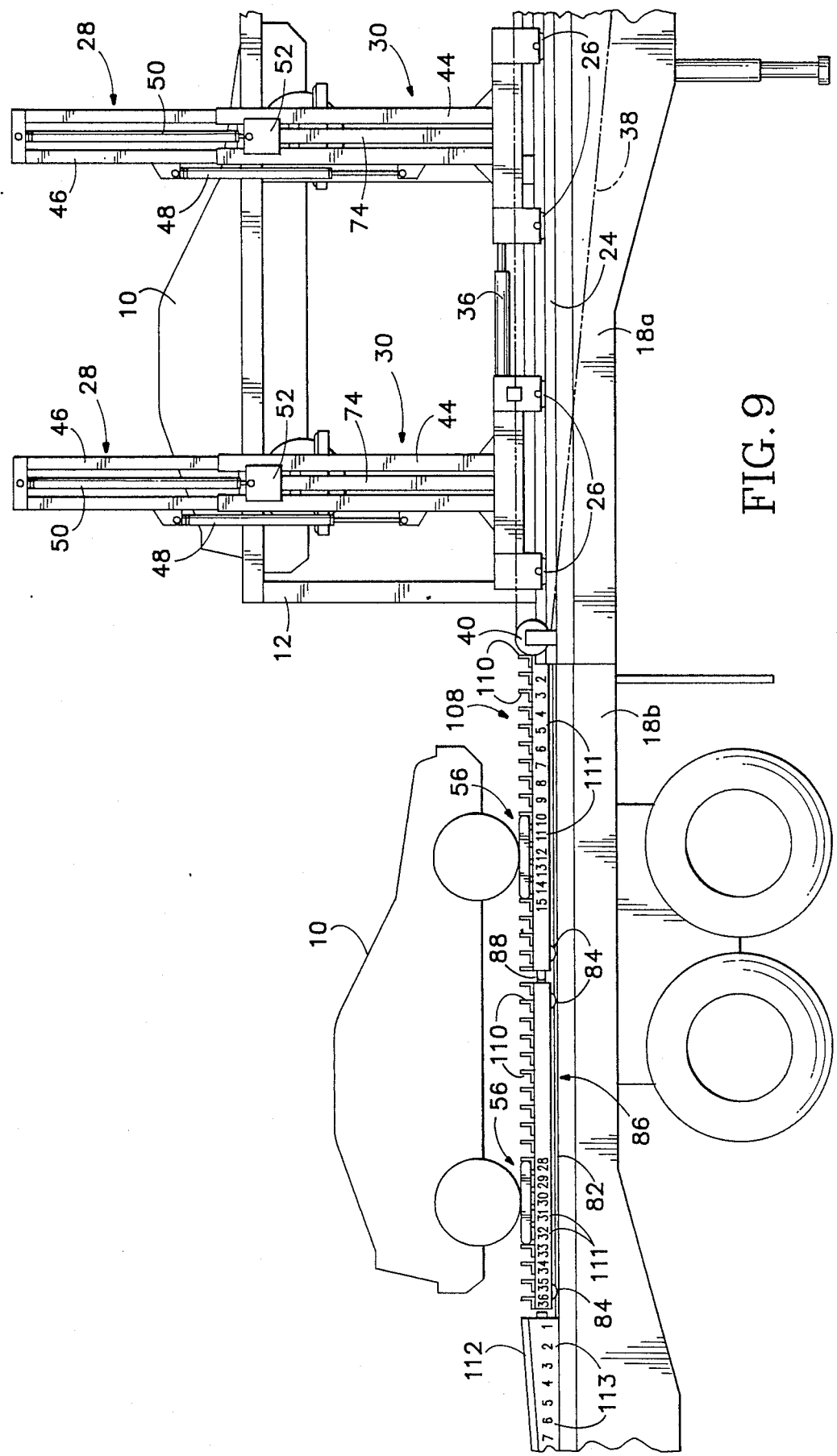
FIG. 9 is a side elevation view, similar to FIG. 7, with the first vehicle raised and attached to the sleeve and a second vehicle on the sled ready to be moved into the sleeve.

In operation the present invention permits fast loading of motor vehicles 10 into sleeves 12 without the requirement that skilled drivers be employed. Each vehicle first is driven up the ramp 114 onto the trailer 118 and then onto the ramp 112 where it temporarily is stopped. An operator then notes the indicia 113 on the ramp 112 which are located below the center lines of the vehicle's tires and places two of the cradles 58 on the sled 86 so that they are centered at the same relative locations as the vehicle's tires based on the indicia 111 located on the sled. The vehicle then is driven onto the sled and stopped with its tires centered above the cradles, FIG. 4. The coupling element 92 is attached to the sled and the chain 90 is moved toward the sleeve 12 until the vehicle is properly positioned within the sleeve. Tension members 74 then are attached to the sleeve in alignment with each of the tires, and cradle latches 64 are placed on the tension members with their shelves 66 positioned under the end plates 62 of the cradles. The gantries 28 then are aligned with the tension members and the cylinders 50 are extended until the chains 80 can be attached to the eyes 72 on the cradle latches. The vehicle now is ready to be raised by the gantries 28 to the proper height in the sleeve as shown in FIG. 8. The raising of the vehicle is accomplished by retracting the cylinders 48, and, if necessary, extending the cylinder 50. When the vehicle is at the proper location in the sleeve the cradle latches 64 are affixed to the tension members 74 by inserting the pins 78 through the cradle latch hooks 70 and the holes 76. The cylinders 48 can then be extended slightly and the chains 80 removed from the cable latches.

While the first vehicle is being lifted by the gantries 28, the chain 90 can be moved in the opposite direction to pull the sled 86 back to its loading position next to the ramp 112. The second vehicle can be driven onto the ramp, the indicia its tires are associated with noted and the next set of cradles positioned on the sled so that the vehicle driven onto them, FIG. 9. The foregoing process then is repeated until the sleeve is completely loaded. Since a succeeding vehicle is loaded onto the sled as the preceding vehicle is being attached to the sleeve, the process allows loading the sleeve quickly without the necessity of actually driving the vehicles onto it.

Once a sleeve is completely loaded the sled is moved to its loading position outside of the sleeve and the rams 116 are extended. The sled then is moved back toward the sleeve until the rams come in contact with it. Further movement of the sled causes the sleeve to be pushed on its wheels 22 along the sleeve guides 20 off of the trailer and into the container 14. When the container reaches its destination, the sled is used to remove the sleeve from the container by moving the sled into the sleeve, extending the rams 116 and then pulling the sled back toward the trailer. When the sled is used to unload a sleeve from a container, the portion of the sled closest to the container can be driven off of the tracks in order to extend into the trailer. The hinge 88, FIG. 7, between the sled sections allows this to occur without the sled being displaced from this track. Once the loaded sleeve is pulled onto the apparatus, the vehicles can be unloaded from it by reversing the procedure described above.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for loading motor vehicles into and unloading motor vehicles from a lightweight elongate sleeve having a predetermined width and length configured to carry a plurality of motor vehicles, comprising:
    (a) means for supporting the sleeve;
    (b) tracks located on said sleeve supporting means;
    (c) a sled which is capable of carrying at least one motor vehicle, is movable along said tracks, and has a width which is less than the width of the sleeve which will be used in conjunction therewith;
    (d) means for moving said sled in either direction along said tracks;
    (e) said tracks having a length that is greater than the length of the sleeve so that said tracks will extend across substantially the entire length of the sleeve and extend outside of said sleeve sufficiently to allow said sled to be moved completely outside of the sleeve;
    (f) means for driving said motor vehicles onto said sleeve when said sled is located outside of the sleeve; and
    (g) means for unloading said motor vehicles from said sled and attaching said motor vehicle stop said sleeve for transportation of said motor vehicles in said sleeve without said sled.

2. The apparatus of claim 1 wherein said means for moving said sled comprises:
    (a) an endless chain which extends along said sleeve supporting means parallel with said tracks;
    (b) a coupling element which is carried by said chain; and
    (c) means for coupling said sled to said coupling element.

3. The apparatus of claim 1 wherein said sled includes means for engaging the sleeve so that the sleeve will move across said sleeve supporting means as said sled is moved along said track.

4. The apparatus of claim 1 wherein said sled includes a pair of parallel wheel ramps which are removably therefrom.

5. The apparatus of claim 4 wherein said wheel ramps includes a plurality of spaced-apart vertical plates.

6. The apparatus of claim 5 wherein the motor vehicles are attached to the sleeve by means of cradles having chocks which engage the tires of said motor vehicles, wherein said plates are arranged to receive said chocks therebetween with no portion of said chocks projecting above said plates so that a motor vehicle can be driven onto said wheel ramps without contacting said chocks.

7. In combination with a lightweight sleeve for supporting a plurality of vehicles in mutually spaced relationship to one another for receipt in a standard closed-sided cargo container, said sleeve comprising an elongate three-dimensional frame open on at least one side thereof to permit vehicles to be loaded axially into the frame, an improved apparatus for loading vehicles into the frame, said apparatus comprising:
    (a) means for supporting the sleeve with the open side thereof exposed for loading;
    (b) a sled separate and apart from the sleeve for supporting one or more vehicles to the open side of the sleeve, said sled being proportioned for movement through the open side of the sleeve;
    (c) means for imparting relative movement between the sleeve and sled to move the sled and a vehicle supported thereon through the open side of and into the sleeve;
    (d) means for suspending vehicles from the sleeve whereby, after a vehicle is moved into the sleeve on the sled, the sled may be removed from the sleeve while leaving the vehicle within the sleeve; and
    (e) means for moving the sleeve onto and off of the sleeve supporting means so that the sleeve and vehicles suspended therefrom may be placed into or removed from a cargo container as a unit.

8. The combination of claim 7 wherein the means for imparting relative movement comprises means for maintaining the sled and sleeve in alignment as the sled moves through the open side of and into the sleeve.

9. The combination of claim 7 wherein the means for imparting relative movement between the sleeve and sled includes the means for moving the sleeve onto and off of the sleeve supporting means.

10. A system for transporting vehicles, said system comprising:
    (a) a sleeve proportioned for the receipt of a plurality of vehicles, said sleeve having an open end for the passage of vehicles thereinto;
    (b) vehicle supporting means to suspend vehicles from the sleeve in mutually spaced relationship to one another;
    (c) a sled separate and apart from said sleeve, said sled being adapted to support at least one vehicle and proportioned for movement through the open side of the sleeve;
    (d) means to move the sled through the open end of and into the sleeve to position a vehicle on the sled for suspension by the vehicle supporting means; and (e) means for removing the vehicles from said sled and supporting it from said vehicle supporting means so that the sled may be removed from the sleeve while leaving the vehicle within the sleeve.

11. The system of claim 10 wherein the means to move the sled comprises means to maintain the sleeve and sled in alignment as the sled moves through the open and and into the sleeve.

* * * * *

UNITED STATES PATENT AND TRADEMARK OFFICE
CERTIFICATE OF CORRECTION

PATENT NO. : 4,957,407
DATED : September 18, 1990
INVENTOR(S) : Peter Gearin

It is certified that error appears in the above-identified patent and that said Letters Patent is hereby corrected as shown below:

Col. 3, Line 43: At end of the line, after "an", insert --element of the invention.--

Col. 6, Line 13: Insert a period between "sled" and "In"

Col. 7, Line 58: Change "stop" to --to--

Col. 8, Line 6: Change "removably" to --removable--

Col. 10, Line 3: Change first "and" to --end--

Signed and Sealed this

Twenty-eighth Day of July, 1992

Attest:

DOUGLAS B. COMER

*Attesting Officer*   *Acting Commissioner of Patents and Trademarks*